United States Patent
Jeong et al.

(10) Patent No.: US 9,844,303 B2
(45) Date of Patent: Dec. 19, 2017

(54) GEAR REDUCER, AND JUICER INCLUDING SAME

(71) Applicant: COWAY CO., LTD., Chungcheongnam-do (KR)

(72) Inventors: Dae Jung Jeong, Seoul (KR); Min Suk Chang, Seoul (KR)

(73) Assignee: COWAY, Co., Ltd., Chungcheongnam-Do (KR)

( * ) Notice: Subject to any disclaimer, the term of this patent is extended or adjusted under 35 U.S.C. 154(b) by 219 days.

(21) Appl. No.: 14/761,692

(22) PCT Filed: Dec. 3, 2014

(86) PCT No.: PCT/KR2014/011765
§ 371 (c)(1),
(2) Date: Jul. 17, 2015

(87) PCT Pub. No.: WO2015/088176
PCT Pub. Date: Jun. 18, 2015

(65) Prior Publication Data
US 2015/0342410 A1    Dec. 3, 2015

(30) Foreign Application Priority Data

Dec. 9, 2013  (KR) .................. 10-2013-0152622
Oct. 15, 2014  (KR) .................. 10-2014-0138843
Nov. 21, 2014  (KR) .................. 10-2014-0163381

(51) Int. Cl.
*F16H 1/46* (2006.01)
*A47J 43/08* (2006.01)
*A47J 19/02* (2006.01)

(52) U.S. Cl.
CPC ............. *A47J 43/08* (2013.01); *A47J 19/025* (2013.01); *F16H 1/46* (2013.01)

(58) Field of Classification Search
CPC ..... F16H 2200/2007; F16H 2200/2097; F16H 3/52; F16H 3/56; F16H 3/58; F16H 3/48; F16H 3/46; F16H 2001/2881
(Continued)

(56) References Cited

U.S. PATENT DOCUMENTS 2,931,252 A * 4/1960 Ferguson .................. F16H 3/58
475/338
3,136,180 A * 6/1964 Sprague .................... F16H 3/58
475/154
(Continued)

FOREIGN PATENT DOCUMENTS

EP        2071212 A1   6/2009
KR   1020060117616 A  11/2006
(Continued)

*Primary Examiner* — Stacey A Fluhart
(74) *Attorney, Agent, or Firm* — McNees Wallace & Nurick LLC

(57) ABSTRACT

A gear reducer and a juicer including the gear reducer are disclosed. The gear reducer transfers rotational force, provided by a drive unit, to a juice extraction screw assembly after gear reduction. The gear reducer includes one or more gear reduction units. At least one of the one or more gear reduction units includes a sun gear coaxially connected to a rotating shaft of the drive unit; a ring gear configured such that a plurality of gear teeth are formed on the inner circumferential surface thereof around the sun gear, and configured to output a rotation speed slower than the rotation speed of the sun gear; and a plurality of planetary gears disposed between the sun gear and the ring gear, and configured to transfer the rotational force of the sun gear to the ring gear.

9 Claims, 4 Drawing Sheets

(58) Field of Classification Search
USPC .......................................................... 475/904
See application file for complete search history.

(56) References Cited

U.S. PATENT DOCUMENTS

| | | | | |
|---|---|---|---|---|
| 4,142,426 | A * | 3/1979 | Baranyi | F16H 1/46 475/338 |
| 4,255,987 | A * | 3/1981 | Ciolli | F16H 3/663 475/270 |
| 6,632,154 | B2 * | 10/2003 | Ushikoshi | F16H 1/46 475/338 |
| 2012/0071293 | A1 * | 3/2012 | Cheung | A47J 43/085 475/331 |

FOREIGN PATENT DOCUMENTS

| KR | 1020070066720 A | 6/2007 |
|---|---|---|
| KR | 1020100124372 A | 11/2010 |
| KR | 1020110138107 A | 12/2011 |
| KR | 101304086 B1 | 9/2013 |
| WO | 2007148872 A1 | 12/2007 |

\* cited by examiner

GEAR REDUCER, AND JUICER INCLUDING SAME

TECHNICAL FIELD

The present invention relates to a gear reducer included in a juicer for grinding and pressing vegetables or fruit to obtain juice, etc., and a juicer including the gear reducer and, more particularly, to a gear reducer capable of considerably reducing the possibility of partial breakdown of a juice extraction screw assembly while reducing rotation speed at a high ratio, and a juicer including the gear reducer.

BACKGROUND ART

In order to have healthy lifestyles, cases of people personally making and drinking vegetable juice or other types of juice in homes have been on the rise. In line with this trend, various types of juice extraction apparatuses, such as juicers, that can be conveniently used in homes have been developed.

In general, conventional juicers are operated in such a manner that fruit or vegetables are accommodated in a housing equipped with a juice extraction screw assembly and the fruit or vegetables are ground and pressed by rotating the juice extraction screw assembly via a drive motor, thereby extracting juice.

Although these conventional juicers are advantageous in that grinding can be performed in a short period of time because fruit flesh, etc. can be ground into small pieces by the juice extraction screw assembly driven at a high speed, they exhibit a limitation in usage when a user desires to have fruit flesh, together with juice, depending on the type of fruit Recently, a method of extracting juice by squeezing fruit or vegetables while rotating a juice extraction screw assembly at a low speed has been used as a method of extracting juice. This method requires considerably high force in order to reduce the rotation speed of the juice extraction screw assembly and squeeze juice.

Korean Patent Application Publication No. 10-2007-0066720 discloses a food processing apparatus including a plurality of gear reduction gear trains disposed in a plurality of vertical stages, wherein each of the gear reduction gear trains includes a sun gear and a plurality of planetary gears.

Korean Patent Application Publication No. 10-2006-0117616 discloses a gear reducer that performs gear reduction via one or more combinations of planetary gears.

However, the above-described conventional technologies are problematic in that the number of planetary gears or the number of gear reduction gear trains should be considerably increased in order to achieve a high gear reduction ratio. In addition, when the number of planetary gears or the number of gear reduction gear trains is increased, another problem arises in that the internal space of a juicer should be increased accordingly.

DISCLOSURE

Technical Problem

The present invention is intended to provide a gear reducer capable of providing a high gear reduction ratio while occupying a smaller space compared to the conventional art, and a juicer including the gear reducer.

The present invention is also intended to provide a gear reducer capable of reducing the possibility of part breakdown compared to the conventional art, and a juicer including the gear reducer.

Technical Solution

In order to accomplish the above objects, the present invention provides a gear reducer for a juicer, the gear reducer transferring rotational force, provided by a drive unit, to a juice extraction screw assembly after gear reduction, the gear reducer including one or more gear reduction units; wherein at least one of the one or more gear reduction units includes a sun gear coaxially connected to a rotating shaft of the drive unit; a ring gear configured such that a plurality of gear teeth are formed on the inner circumferential surface thereof around the sun gear, and configured to output a rotation speed slower than the rotation speed of the sun gear; and a plurality of planetary gears disposed between the sun gear and the ring gear, and configured to transfer the rotational force of the sun gear to the ring gear.

The plurality of planetary gears may include a plurality of inner planetary gears directly engaged with the sun gear; and a plurality of outer planetary gears engaged between the plurality of inner planetary gears and the ring gear.

The number of the inner planetary gears and the number of the outer planetary gears may be each 3×L (where L is a natural number).

The number of gear teeth of the sun gear may be $3 \times M_1$, the number of gear teeth of the inner planetary gear may be $3 \times M_2$, the number of gear teeth of the outer planetary gear may be $3 \times M_3$, and the number of gear teeth of the ring gear may be $3 \times M_4$ (where $M_1$, $M_2$, $M_3$, and $M_4$ are natural numbers).

The number of gear teeth of the sun gear may be $12 \times N_1$, the number of gear teeth of the inner planetary gear may be $15 \times N_2$, the number of gear teeth of the outer planetary gear may be $15 \times N_3$, and the number of gear teeth of the ring gear may be $60 \times N_4$ (where $N_1$, $N_2$, $N_3$, and $N_4$ are natural numbers).

The gear reducer may include a primary gear reduction unit configured to primarily gear-reduce the rotational force provided by the drive unit, and a secondary gear reduction unit configured to secondarily gear-reduce the rotational force provided by the drive unit; the primary gear reduction unit may include a first sun gear coaxially connected to the rotating shaft of the drive unit, a first ring gear configured such that a plurality of gear teeth are formed on an inner circumferential surface thereof around the first sun gear, and configured to output a primarily gear-reduced rotation speed slower than a rotation speed of the first sun gear, and a plurality of first planetary gears disposed between the first sun gear and the first ring gear, and configured to transfer the rotational force of the first sun gear to the first ring gear; and the secondary gear reduction unit may include a second sun gear coaxially connected to the rotating shaft of the drive unit, a second ring gear configured such that a plurality of gear teeth are formed on the inner circumferential surface thereof around the second sun gear, and configured to output a secondarily gear-reduced rotation speed slower than the rotation speed of the second sun gear, and a plurality of second planetary gears disposed between the second sun gear and the second ring gear, and configured to transfer the rotational force of the second sun gear to the second ring gear.

The plurality of second planetary gears may be rotatably mounted on the first ring gear rotating with the primarily gear-reduced rotation speed, and a rotating shaft of the juice extraction screw assembly is connected to a shaft connection hole of the second ring gear rotating with the secondarily gear-reduced rotation speed.

The plurality of second planetary gears may include a plurality of inner planetary gears directly engaged with the second sun gear; and a plurality of outer planetary gears engaged between the plurality of inner planetary gears and the second ring gear.

The gear reducer may be separably installed in the juicer so that the juicer can be selectively used in low speed mode based on application of the gear reducer and in high speed mode based on the separation of the gear reducer.

In order to accomplish the above objects, the present invention also provides a juicer including the above-described gear reducer.

Advantageous Effects

According to the present invention, there is provided a gear reducer capable of providing a high gear reduction ratio while occupying a smaller space compared to the conventional art, and a juicer including the gear reducer.

According to the present invention, there is also provided a gear reducer capable of reducing the possibility of part breakdown compared to the conventional art, and a juicer including the gear reducer.

DESCRIPTION OF DRAWINGS

The above and other objects, features and advantages of the present invention will be more clearly understood from the following detailed description taken in conjunction with the accompanying drawings, in which.

MODE FOR INVENTION

Embodiments of the present invention will be described in detail with reference to the accompanying drawings. The thicknesses of lines, the sizes of components, etc. illustrated in the accompanying drawings may be exaggerated for clarity and convenience of description.

Furthermore, terms that will be used below will be defined based on their functions in the context of the present invention, and the definitions of these terms may vary depending on a user or operator's intention or practice. Accordingly, the definitions of these terms should be determined based on the overall description of the present specification.

Throughout the specification, the term "juice extraction" should be understood as including all the steps of cutting, grinding, pressing and/or extracting a material put into a juicer.

In connection with the present invention, when juice extraction is performed on a material, "juice" and "pulp" are generated. In this case, the term "juice" should be understood as referring to an object that a user desires to obtain and drink through juice extraction that is performed on a material, and the term "pulp" refers to a byproduct, other than juice, that is generated in a juice extraction process, and should be generally understood as referring to a material discharged to the outside.

1. Description of Structure of Juicer Including Gear Reducer

A juicer including a gear reducer according to an embodiment of the present invention is described with reference to FIG. 1.

Figure 1:
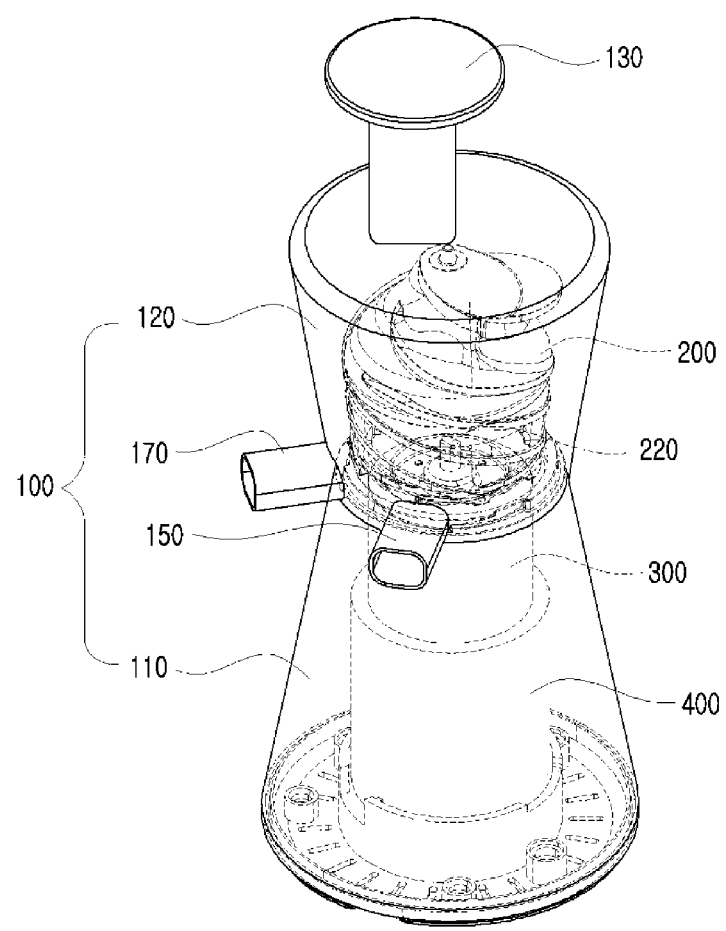
FIG. 1 is a perspective view of a juicer according to an embodiment of the present invention.

Referring to FIG. 1, the juicer according to the present embodiment includes a housing 100, a juice extraction screw assembly 200, a gear reducer 300, and a drive unit 400.

The housing 100 includes a lower housing 110 and an upper housing 120. The gear reducer 300 and the drive unit 400 are accommodated inside the lower housing 110, and the juice extraction screw assembly 200 is accommodated inside the upper housing 120.

A pushing member 130 illustrated in FIG. 1 is used to put a juice extraction target object into the upper housing 120. A user can easily put a juice extraction target object into the upper housing 120 using the pushing member 130. After the juice extraction target object has been put into the upper housing 120, the juice extraction target object is ground and pressed by the juice extraction screw assembly 200, and thus is separated into juice and pulp. The juice and the pulp may be discharged from the upper housing 120 through corresponding discharge tubes 170 and 150.

The drive unit 400 provides rotational force that is used to rotate the juice extraction screw assembly 200. In the present embodiment, a motor is used as the drive unit 400.

The drive unit 400 may directly drive the juice extraction screw assembly 200, or may drive the juice extraction screw assembly 200 via the gear reducer 300. For this purpose, the gear reducer 300 is not fixedly installed between the drive unit 400 and the juice extraction screw assembly 200, but may be separably installed therebetween.

When the gear reducer 300 is applied between the drive unit 400 and the juice extraction screw assembly 200, the juice extraction screw assembly 200 is connected to the drive unit 400 via the gear reducer 300, in which case the rotational force of the drive unit 400 is transferred to the juice extraction screw assembly 200 after undergoing gear reduction by the gear reducer 300. Meanwhile, when the gear reducer 300 is separated from the juicer, the juice extraction screw assembly 200 receives the rotational force without the intervention of gear reduction by the drive unit 400.

As described above, the gear reducer 300 is separably installed between the drive unit 400 and the juice extraction screw assembly 200, and thus the juicer may be used in low speed mode based on the application of the gear reducer 300 or in high speed mode based on the separation of the gear reducer 300.

2. Description of Structure and Operation of Gear Reducer

Figure 2:
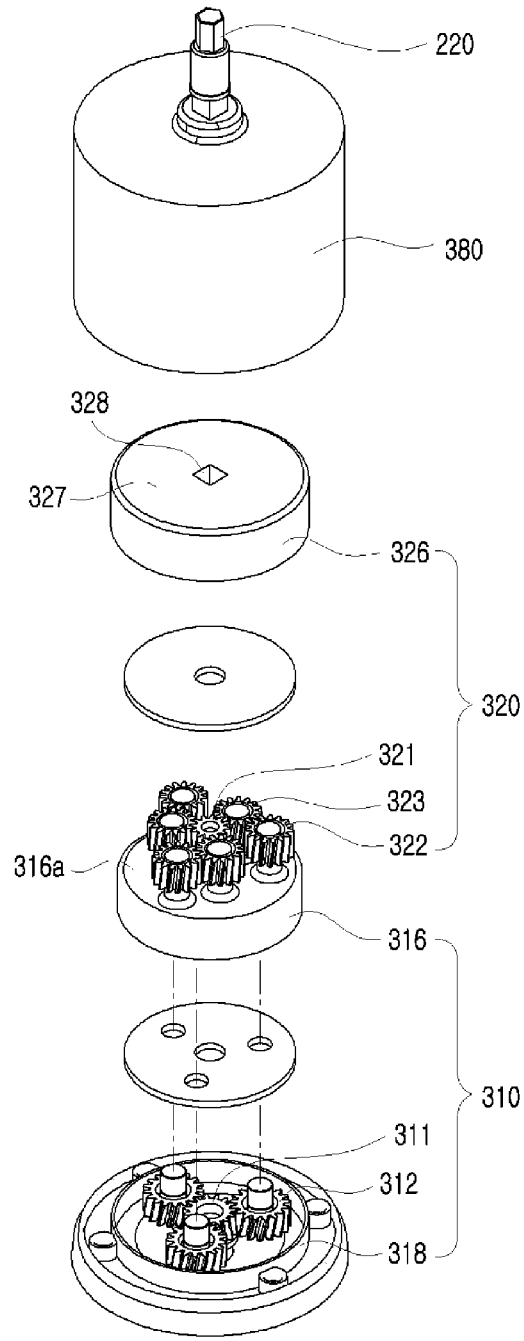
FIG. 2 is an exploded perspective view of a gear reducer provided in the juicer of FIG. 1.

The structure and operation of the gear reducer 300 are described with reference to FIGS. 2, 3, and 4.

The gear reducer 300 according to an embodiment of the present invention includes a primary gear reduction unit 310 and a secondary gear reduction unit 320. These gear reduction units 310 and 320 are accommodated in a casing 380, and thus are not exposed to the outside.

In this case, the primary gear reduction unit 310 performs primary gear reduction on the rotational force provided by the drive unit 400, and the secondary gear reduction unit 320 performs secondary gear reduction on the rotational force provided by the drive unit 400. The rotational force provided by the drive unit 400 via the primary and secondary gear reduction units 310 and 320 undergoes two-stage gear reduction, and thus a high gear reduction ratio can be achieved.

The gear reducer 300 according to the present embodiment may provide a gear reduction ratio of 1/85. According to the conventional technology, three or more-stage gear reduction is required to provide this level of gear reduction ratio. In contrast, the present embodiment can provide a high gear reduction ratio using only two-stage gear reduction, and thus the volume of a gear reducer required to provide the same gear reduction ratio can be reduced compared to conventional one.

The primary gear reduction unit 310 includes a first sun gear 311, a first ring gear 316, a plurality of first planetary gears 312, and a gear box 318.

The first sun gear 311 is disposed at the center of the gear box 318, and is coaxially connected with the rotating shaft (not illustrated) of the drive unit 400. Accordingly, the first sun gear 311 rotates at the same rotation speed as the rotating shaft of the drive unit 400.

A plurality of gear teeth are formed on the inner circumferential surface of the first ring gear 316 around the first sun gear 311. As clearly illustrated in FIG. 3, the first ring gear 316 has the number of gear teeth considerably larger than the number of teeth of the first sun gear 311.

The plurality of first planetary gears 312 is disposed between the first sun gear 311 and the first ring gear 316, and transfers the rotational force of the first sun gear 311 to the first ring gear 316. Each of the first planetary gears 312 is engaged with the first sun gear 311 and the first ring gear 316. In the case of the present embodiment, three planetary gears 312 having the same shape are provided in the primary gear reduction unit 310.

Figure 3:
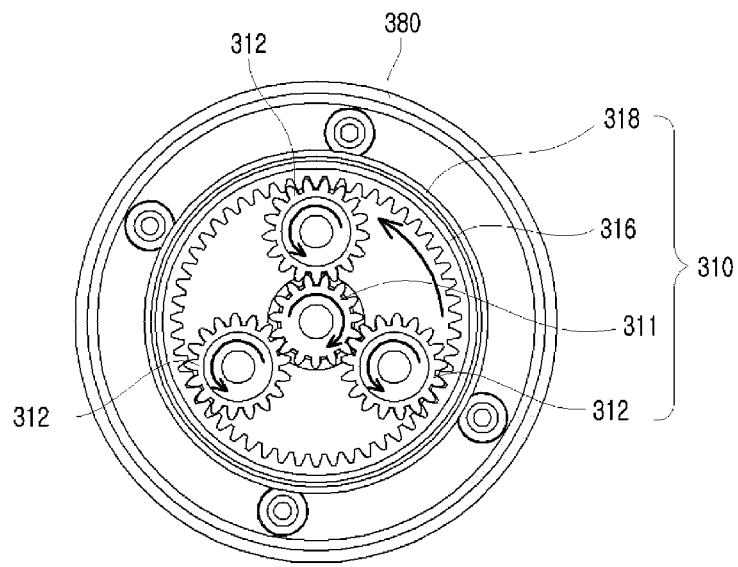
FIG. 3 is a lateral sectional view of a primary gear reduction unit provided in the gear reducer of FIG. 2.

As illustrated in FIG. 3, when the first sun gear 311 is rotated in a first direction (a clockwise direction in the drawing) by the drive unit 400, the first ring gear 316 connected to the first sun gear 311 via the first planetary gears 312 is rotated in a second direction opposite the first direction (a counterclockwise in the drawing). Meanwhile, since the first ring gear 316 has the number of gear teeth considerably larger than the number of teeth of the first sun gear 311, the first ring gear 316 rotates at a rotation speed slower than the rotation speed of the first sun gear 311. According to this principle, primary gear reduction is achieved by the primary gear reduction unit 310, and thus the first ring gear 316 outputs a primarily gear-reduced rotation speed slower than the rotation speed of the drive unit 400.

The secondary gear reduction unit 320 is disposed above the above-described primary gear reduction unit 310, and includes a second sun gear 321, a second ring gear 326, and a plurality of second planetary gears 322 and 323.

The second sun gear 321 is disposed at the center of the top surface 316a of the above-described first ring gear 316, and is coaxially connected to the rotating shaft (not illustrated) of the drive unit 400.

A plurality of gear teeth are formed on the inner circumferential surface of the second ring gear 326 around the second sun gear 311. As clearly illustrated in FIG. 4, the second ring gear 326 has the number of gear teeth considerably larger than the number of gear teeth of the second sun gear 321 (five times in the present embodiment). As illustrated in FIG. 2, a shaft connection hole 328 into which the rotating shaft 220 of the juice extraction screw assembly 200 is inserted is formed through the top surface 327 of the second ring gear 326. Here, it can be appreciated that the juice extraction screw assembly 200 rotates at the same speed as the second ring gear 326.

The plurality of second planetary gears 322 and 323 is used to transfer the rotational force of the second sun gear 321 to the second ring gear 326. The plurality of second planetary gears 322 and 323 is rotatably disposed on the above-described top surface 316a of the first ring gear 316, and is disposed between the second sun gear 321 and the second ring gear 326.

Figure 4:
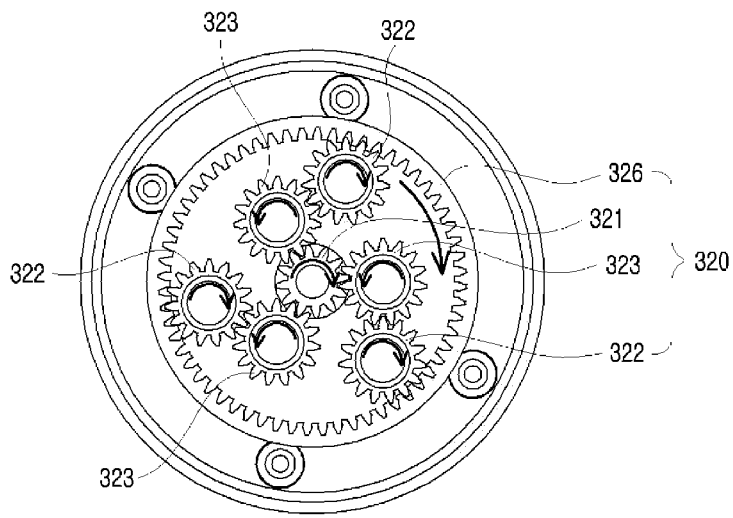
FIG. 4 is a lateral sectional view of a secondary gear reduction unit provided in the gear reducer of FIG. 2.

As illustrated in FIG. 4, when the second sun gear 321 is rotated in a first direction (a clockwise direction in the drawing) by the drive unit 400, the second ring gear 326 connected to the second sun gear 321 via the second planetary gears 322 and 323 is also rotated in the first direction (in the clockwise direction in the drawing). Meanwhile, since the second ring gear 326 has the number of gear teeth considerably larger than the number of gear teeth of the second sun gear 321, the second ring gear 326 is rotated at a rotation speed slower than the rotation speed of the second sun gear 321. According to this principle, secondary gear reduction is achieved by the secondary gear reduction unit 320.

In this case, since the second planetary gears 322 and 323 are mounted on the first ring gear 316 rotating with the primarily gear-reduced rotation speed as described above, the rotation speed of the second ring gear 326 that are driven by the second planetary gears 322 and 323 is influenced by both the primary gear reduction and the secondary gear reduction. More specifically, since the second planetary gears 322 and 323 are mounted on the first ring gear 316 rotating in the counterclockwise direction, the second planetary gears 322 and 323 revolves around the sun gear 321 in a rotation direction (a counterclockwise direction) opposite the rotation direction (clockwise direction) of the second sun gear 321. The output speed of the second ring gear 326 is influenced by both the above-described primary gear reduction and secondary gear reduction because of the influence of the revolution of the planetary gears 322 and 323.

Accordingly, the juice extraction screw assembly 200 rotatably connected to the second ring gear 326 receives rotational force gear-reduced in two stages via the gear reducer 300 in low-speed mode. In the present embodiment, the juice extraction screw assembly 200 is rotated at a rotation speed gear-reduced to 1/85 of the rotation speed of the drive unit 400. As described above, the gear reducer 300 of the present embodiment has the primary gear reduction unit 310 and the secondary gear reduction unit 320, and thus can provide a high gear reduction ratio. Since the high gear reduction ratio is achieved by the gear reducer 300 including only two gear reduction units 310 and 320, the volume of a gear reducer for the same gear reduction ratio can be relatively reduced.

Figure 5:
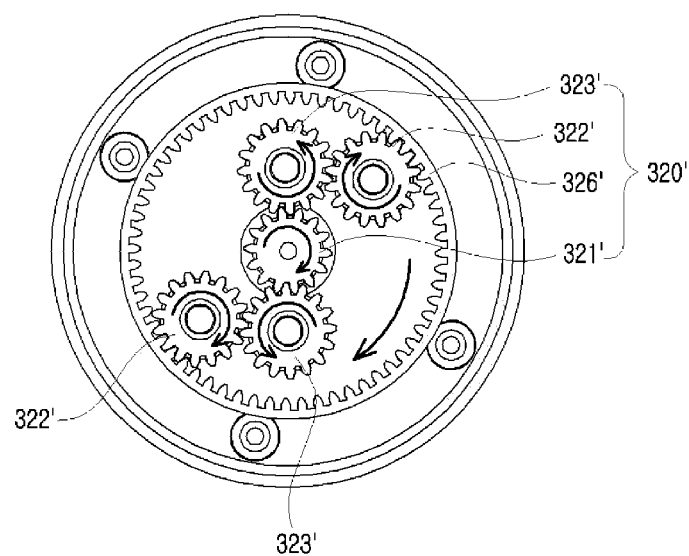
FIG. 5 is a plan view of an alternative embodiment of the secondary gear reduction unit.

FIG. 5 is a plan view illustrating an alternative embodiment of the secondary gear reduction unit Like the above-described secondary gear reduction unit 320, the alternative secondary gear reduction unit 320' illustrated in FIG. 5 also includes a second sun gear 321', a second ring gear 326', and a plurality of second planetary gears 322' and 323'. In this case, the plurality of second planetary gears 322' and 323' includes a plurality of inner planetary gears 323' directly engaged with the second sun gear 321' and a plurality of outer planetary gears 322' engaged between the inner planetary gears 323' and the second ring gear 326'.

The gears 321', 322', 323' and 326' of the secondary gear reduction unit 320' have a connection structure corresponding to the connection structure of the gears 321, 322, 323 and 326 of the above-described secondary gear reduction unit 320. More specifically, the second sun gear 321' is coaxially connected to the rotating shaft of the drive unit 400 (see FIG. 1), the plurality of second planetary gears 322' and 323' are rotatably mounted on the top surface 316a of the first ring gear 316, and the rotating shaft 220 of the screw assembly 200 is connected to the center of the second ring gear 326'.

Accordingly, the operation method of the secondary gear reduction unit 320' also corresponds to the above-described operation method of the secondary gear reduction unit 320.

The secondary gear reduction unit 320' of FIG. 5 is different from the secondary gear reduction unit 320 of FIG. 4 only in that the secondary gear reduction unit 320' of FIG. 5 includes the two inner planetary gears 323' and the two outer planetary gears 322' while the secondary gear reduction unit 320 of FIG. 4 includes the three inner planetary gears 323 and the three outer planetary gears 322. As described above, according to the present invention, the secondary gear reduction unit may include the number of inner planetary gears equal to a multiple of 2 and the number of outer planetary gears equal to a multiple of 2.

3. Description of Part Breakdown Prevention Structure of Gear Reducer

The part breakdown prevention structure of the above-described gear reducer 300 is described below.

In order to achieve effective gear reduction via the above-described primary gear reduction unit 310 and secondary gear reduction unit 320, to reduce the possibility of part breakdown attributable to interaction between gears, and to prevent gear engagement from being released, the following conditions may be applied:

1) Condition 1:

First, as illustrated in FIG. 4, the plurality of second planetary gears 322 and 323 provided in the secondary gear reduction unit 320 are configured to include the plurality of inner planetary gears 323 directly engaged with the second sun gear 321 and the plurality of outer planetary gears 322 engaged between the plurality of inner planetary gears 323 and the second ring gear 326.

The structure of the secondary gear reduction unit 320 contrasts with the structure of the primary gear reduction unit 310 in which the plurality of first planetary gears 312 are all engaged with the first sun gear 311. That is, as clearly illustrated in FIGS. 3 and 4, in the present embodiment, the condition 1 is reflected into the secondary gear reduction unit 320, but is not reflected into the primary gear reduction unit 310.

However, In an alternative embodiment, the condition 1 may be applied to the primary gear reduction unit 310 in the same manner, in which case the plurality of first planetary gears 312 of the primary gear reduction unit 310 is configured to include a plurality of inner planetary gears directly engaged with the first sun gear 311 and a plurality of outer planetary gears engaged between the inner planetary gears and the first ring gear 316. Furthermore, on the contrary to the present embodiment, an embodiment in which the condition 1 is not reflected into the secondary gear reduction unit 320 and the condition 1 is reflected only in the primary gear reduction unit 310 may be possible.

When the condition 1 is applied, the advantage of a reduction in the possibility of the part breakdown of the gear reduction units 310 and 320 provided in the gear reducer 300 can be achieved.

2) Condition 2:

Second, as illustrated in FIG. 4, the number of inner planetary gears 323 and the number of outer planetary gears 322 are each configured to be a multiple of 3, and the number of gear teeth second of sun gear 321, the number of gear teeth of inner planetary gears 323, the number of gear teeth of outer planetary gears 322 and the number of gear teeth of second ring gear 326 are each configured to be a multiple of 3.

In other words, the number of inner planetary gears 323 and the number of outer planetary gears 322 are each configured to be 3×L (where L is a natural number), the number of gear teeth of the second sun gear 321 is configured to be $3 \times M_1$, the number of gear teeth of inner planetary gears 323 is configured to be $3 \times M_2$, the number of gear teeth of outer planetary gears 322 is configured to be $3 \times M_3$, and the number of gear teeth of the second ring gear 326 is configured to be $3 \times M_4$ (where $M_1$, $M_2$, $M_3$ and $M_4$ are natural numbers).

It can be readily seen from FIG. 4 that the condition 2 has been reflected into the secondary gear reduction unit 320. As can be seen from the drawing, the number of inner planetary gears 323 and the number of outer planetary gears 322 are each three, and the number of gear teeth of the second sun gear 321, the number of gear teeth of the inner planetary gears 323, the number of gear teeth of the outer planetary gears 322 and the number of gear teeth of the second ring gear 326 are 12, 15, 15 and 60, respectively.

It will be apparent that the number of gear teeth of the second sun gear 321, the number of gear teeth of the inner planetary gears 323, the number of gear teeth of the outer planetary gears 322, and the number of gear teeth of the second ring gear 326 may be a multiple of 12, a multiple of 15, a multiple of 15, and a multiple of 60, respectively. That is, the number of gear teeth of the second sun gear 321 may be $15 \times N_1$, the number of gear teeth of the inner planetary gear 323 may be $15 \times N_2$, the number of gear teeth of the outer planetary gear 322 may be $15 \times N_3$, and the number of gear teeth of the second ring gear 326 may be $60 \times N_4$ (where $N_1$, $N_2$, $N_3$ and $N_4$ are natural numbers).

The possibility of the part breakdown of the secondary gear reduction unit 320 can be reduced by applying the above-described condition 1, and also the release of gear engagement that may occur due to the application of the condition 1 can be prevented by applying the condition 2.

Although the present invention has been described with reference to the embodiments illustrated in the accompanying drawings above so that those skilled in the art can easily understand and practice the present invention, these embodiments are merely illustrative. Accordingly, it will be apparent to those skilled in the art that various modifications and other equivalent embodiments can be made based on the above detailed description of the embodiments. Therefore, the range of protection of the present invention should be defined based on the following claims.

The invention claimed is:

1. A gear reducer for a juicer, the gear reducer transferring rotational force, provided by a drive unit, to a juice extraction screw assembly after gear reduction, the gear reducer comprising:
one or more gear reduction units;
wherein at least one of the one or more gear reduction units comprises:
a sun gear coaxially connected to a rotating shaft of the drive unit;
a ring gear configured such that a plurality of gear teeth are formed on an inner circumferential surface thereof around the sun gear, and configured to output a rotation speed slower than a rotation speed of the sun gear; and a plurality of planetary gears disposed between the sun gear and the ring gear, and configured to transfer the rotational force of the sun gear to the ring gear;

the plurality of planetary gears comprising:
  a plurality of inner planetary gears directly engaged with the sun gear; and
  a plurality of outer planetary gears engaged between the plurality of inner planetary gears and the ring gear;

the number of the inner planetary gears and the number of the outer planetary gears are each $3 \times L$ (where L is a natural number), and the number of gear teeth of the sun gear is $12 \times N_1$, the number of gear teeth of the inner planetary gear is $15 \times N_2$, the number of gear teeth of the outer planetary gear is $15 \times N_3$, and the number of gear teeth of the ring gear is $60 \times N_4$ (where $N_1$, $N_2$, $N_3$, and $N_4$ are natural numbers).

2. The gear reducer of claim 1, wherein the gear reducer is separably installed in the juicer so that the juicer can be selectively used in a low speed mode based on the application of the gear reducer and in a high speed mode based on the separation of the gear reducer.

3. A juicer comprising the gear reducer set forth in claim 1.

4. A gear reducer for a juicer, the gear reducer transferring rotational force, provided by a drive unit, to a juice extraction screw assembly after gear reduction, the gear reducer comprising:
  a primary gear reduction unit configured to primarily gear-reduce the rotational force provided by the drive unit; and
  a secondary gear reduction unit configured to secondarily gear-reduce the rotational force provided by the drive unit;
  wherein the primary gear reduction unit comprises:
  a first sun gear coaxially connected to the rotating shaft of the drive unit;
  a first ring gear configured such that a plurality of gear teeth are formed on an inner circumferential surface thereof around the first sun gear, and configured to output a primarily gear-reduced rotation speed slower than a rotation speed of the first sun gear; and
  a plurality of first planetary gears disposed between the first sun gear and the first ring gear, and configured to transfer rotational force of the first sun gear to the first ring gear;

the secondary gear reduction unit comprises:
  a second sun gear coaxially connected to the rotating shaft of the drive unit;
  a second ring gear configured such that a plurality of gear teeth are formed on an inner circumferential surface thereof around the second sun gear, and configured to output a secondarily gear-reduced rotation speed slower than a rotation speed of the second sun gear; and
  a plurality of second planetary gears disposed between the second sun gear and the second ring gear, and configured to transfer rotational force of the second sun gear to the second ring gear; and the plurality of second planetary gears is rotatably mounted on the first ring gear rotating with the primarily gear-reduced rotation speed, and a rotating shaft of the juice extraction screw assembly is connected to a shaft connection hole of the second ring gear rotating with the secondarily gear-reduced rotation speed.

5. The gear reducer of claim 4, wherein the plurality of second planetary gears comprises:
  plurality of inner planetary gears directly engaged with the second sun gear; and
  a plurality of outer planetary gears engaged between the plurality of inner planetary gears and the second ring gear.

6. The gear reducer of claim 5, wherein the number of the inner planetary gears and the number of the outer planetary gears are each $3 \times L$ (where L is a natural number).

7. The gear reducer of claim 6, wherein the number of gear teeth of the second sun gear is $3 \times M_1$, the number of gear teeth of the inner planetary gears is $3 \times M_2$, the number of gear teeth of the outer planetary gears is $3 \times M_3$, and the number of gear teeth of the second ring gear is $3 \times M_4$ (where $M_1$, $M_2$, $M_3$ and $M_4$ are natural numbers).

8. The gear reducer of claim 7, wherein the number of gear teeth of the second sun gear is $15 \times N_1$, the number of gear teeth of the inner planetary gear is $15 \times N_2$, the number of gear teeth of the outer planetary gear is $15 \times N_3$, and the number of gear teeth of the second ring gear is $60 \times N_4$ (where $N_1$, $N_2$, $N_3$, and $N_4$ are natural numbers).

9. A juicer comprising the gear reducer set forth in claim 4.

* * * * *